United States Patent [19]

Ohsaki et al.

[11] 4,321,234
[45] Mar. 23, 1982

[54] CHEMICAL PROCESS AND APPARATUS THEREFOR

[75] Inventors: Kozo Ohsaki, Funabashi; Jun Zamma; Yukihiro Kobayasi, both of Chiba; Hiroshi Watanabe, Kanagawa, all of Japan

[73] Assignee: Toyo Engineering Corporation, Tokyo, Japan

[21] Appl. No.: 219,359

[22] Filed: Dec. 22, 1980

Related U.S. Application Data

[62] Division of Ser. No. 133,798, Mar. 25, 1980.

[30] Foreign Application Priority Data

Apr. 3, 1979 [JP] Japan .................................... 54/39306

[51] Int. Cl.³ .............................. F28D 7/00; B01J 8/02
[52] U.S. Cl. .................................... 422/200; 422/205; 422/218

[58] Field of Search ............... 422/200, 201, 202, 205, 422/213, 218

[56] References Cited

U.S. PATENT DOCUMENTS

| 2,664,346 | 12/1953 | Mayhew | 422/201 X |
| 2,744,813 | 5/1956 | Paul | 422/200 |
| 2,997,374 | 8/1961 | Layender, Jr. et al. | 422/218 |
| 3,907,665 | 9/1975 | Winter et al. | 422/202 X |
| 3,944,394 | 3/1976 | McClintock et al. | 422/201 |

Primary Examiner—William A. Cuchlinski, Jr.

[57] ABSTRACT

A vertical, cylindrical reaction vessel for catalytic, exothermic gas-phase reaction in which gaseous raw materials are passed substantially in the radial direction through a catalyst layer including therein cooling tubes extended vertically. A cooling medium is passed through the cooling tubes to remove the heat of reaction generated thereby attaining the optimum temperature distribution along the direction of flow of the gaseous raw materials.

11 Claims, 8 Drawing Figures

FIG. 3
FIG. 6
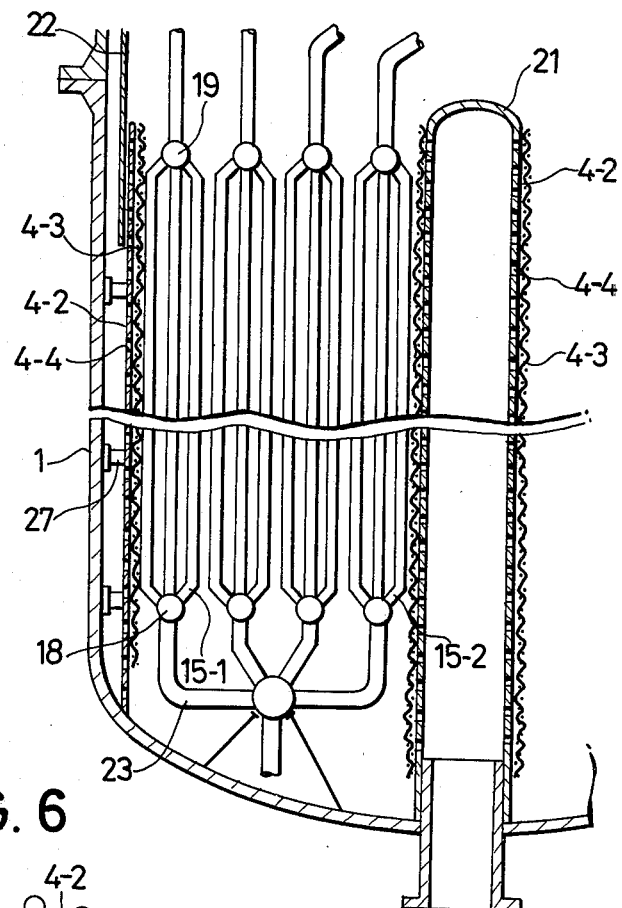
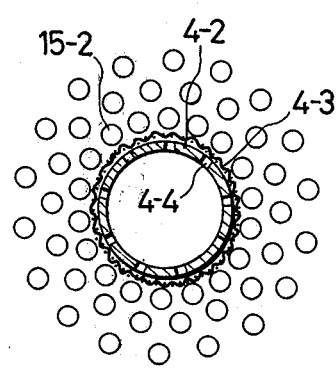

CHEMICAL PROCESS AND APPARATUS THEREFOR

This is a division of application Ser. No. 133,798 filed Mar. 25, 1980.

BACKGROUND OF THE INVENTION

1. Field of the Invention

The present invention relates to an improved process for reacting gaseous raw materials by contacting same with a catalyst and an improved vertical cylindrical reaction vessel for conducting such reaction.

2. Description of the Invention

Conversion reaction accomplished by contacting a gaseous starting material with a solid catalyst under an appropriate pressure is now utilized for synthesis of ammonia, synthesis of methanol, methanation and other various purposes. In many cases, this conversion reaction is an exothermic reaction conducted under a pressure higher than atmospheric pressure. Accordingly, the temperature of the gas and catalyst is extremely elevated by the heat of reaction, resulting in degradation of the catalyst performance and reduction of the concentration of the intended product because of the chemical equilibrium. Therefore, such excessive elevation of the temperature of the gas and catalyst should be avoided, and many contrivances have heretofore been made for attaining this object.

A most popular method for removing the heat of reaction is to utilize the heat of reaction for preheating a starting gas to be supplied to the catalyst layer. More specifically, according to this method, heat exchange is conducted between a high temperature gas present in or leaving from the catalyst layer and a low temperature gas being introduced into the catalyst layer to elevate the temperature of the gas introduced into the catalyst layer to a level necessary for initiating the reaction. Ordinarily, the heat exchange is carried out under substantially the same pressure as the reaction pressure, and a catalyst and a gas-gas heat exchanger are disposed in one reaction vessel.

In this method for preheating the introduced gas by utilizing the heat of reaction, the quantity of the heat of reaction is larger than the quantity of the heat necessary for preheating, and in the catalyst layer, the temperature on the effluent side is much higher than the temperature on the introduction side. Therefore, no satisfactory advantage can be attained with respect to the above-mentioned catalyst activity or chemical equilibrium. Moreover, this method is defective in that another apparatus is necessary for recovering the excess heat reaction sufficiently and the level of the recovered heat energy is reduced.

Another method of removing the heat of reaction, which is frequently adopted, is to remove the heat of reaction by evaporating a liquid under an appropriate pressure. As the liquid to be evaporated, water is most preferred from the practical viewpoint, though Dowtherm or a hydrocarbon mixture having an appropriate boiling point can also be used.

In this method, it is essential that the liquid be evaporated under a pressure providing an appropriate boiling point lower than the catalyst temperature in order to prevent excessive elevation of the temperature of the catalyst, and the heat of reaction is removed by the evaporation of the cooling liquid. Ordinarily, the pressure of the cooling liquid is lower than the pressure of the gas, and a reaction vessel having a structure as shown in FIG. 1 illustrating the vertical section thereof is used.

Referring to FIG. 1, upper tube sheet 2 and lower tube sheet 3 are gas-tightly fixed to a pressure shell 1, and a large number of tubes 5 are gas-tightly fixed to these tube sheets 2 and 3. A net 4 is disposed below the tube sheet 3 to support a catalyst, and a catalyst layer 6 is packed inside each of tubes 5. A gas compressed to a reaction pressure and preheated to a appropriate temperature is introduced from a gas inlet 7, passed through the catalyst layer 6 and fed to the next step from a gas outlet 8. While the gas is passed through the catalyst layer, the conversion reaction takes place, and the heat generated by the reaction is transferred through the catalyst layer 6 and the wall of each of the tubes 5 to a cooling liquid introduced from a cooling liquid inlet 9 to a space between the pressure shell 1 and the tube sheets 2 and 3 outside the tubes 5 and the heat of reaction is removed by boiling and evaporation of the cooling liquid. The cooling liquid is discharged from an outlet 10 in the form of a vapor or a liquid-vapor mixture, and the heat possessed by the vapor or liquid-vapor mixture is used for attaining an intended purpose, for example, driving a turbine to compress the starting gas. The reaction vessel of this cooling liquid evaporation type is advantageous over the above-mentioned reaction vessel of the gas-gas heat exchange type with respect to prevention of excessive elevation of the temperature of the catalyst and effective utilization of the heat of reaction.

However, from the viewpoint of recently increased importance of saving of energy and necessity of increasing the size of a single reactor, new problems arise in the reaction vessel of the cooling liquid evaporation type.

The first problem is that in order to increase the degree of effective utilization of the heat of reaction, a higher vapor temperature and a higher vapor pressure are desired. For example, when the generated vapor is steam and it is introduced into a turbine and converted to a mechanical energy, steam held at 100 Kg/cm$^2$G and 480° C. is expanded to 40 Kg/cm$^2$G, thereby an energy of about 50 KWH per ton of steam is recovered. However, if the pressure of generated steam is 40 Kg/cm$^2$G, the energy corresponding to this steam pressure is not recovered. The structure shown in FIG. 1 is not suitable for a large scale reaction vessel. When the high pressure of generated steam is desired.

The second problem is that the reaction pressure is reduced. For example, in the manufacture of ammonia or methanol, a pressure of 100 to 300 Kg/cm$^2$G is ordinarily adopted for the conversion reaction. In this case, it is necessary to compress the raw gas from a pressure level of 20 to 40 Kg/cm$^2$G at the gas generation step to a level of 100 to 300 Kg/cm$^2$G. If the pressure for the conversion reaction is reduced below 100 Kg/cm$^2$G, the power necessary for this compression can be remarkably reduced. For the reason of chemical equilibrium, reduction of the reaction pressure is possible if there is available a catalyst having a high activity at a low temperature. Furthermore, it is known that the lower are the temperature and pressure for the conversion reaction, the larger is the quantity of the heat generated by the reaction, and that degradation of the activity by excessive elevation of the temperature is conspicuous in a catalyst exerting the catalytic activity at a low temperature. Accordingly, in order to solve this second problem, it is necessary to increase the sectional area of the gas passage for flowing of a low-pressure and large-volume raw material gas and completely control the temperature inside the catalyst layer. However, this can hardly be attained by the structure of the reaction vessel comprising a catalyst layer disposed in a tube as shown in FIG. 1.

The third problem arises with increase of the size of a single reactor. More specifically, in the reaction vessel shown in FIG. 1, in order to prevent leakage between the cooling medium and reaction effluent gas differing in the pressure, it is necessary to fix gas-tightly the tubes 5 to the tube sheets 2 and 3 and also fix gas-tightly the tube sheets 2 and 3 to the pressure shell 1 by welding or other means. However, since the temperature of the tubes 5 is different from the temperature of the pressure shell 1, the vertical length between the tube sheets 2 and 3 is changed because of the difference of thermal expansion during the operation. Even if a metal material having a thermal expansion coefficient substantially equal to that of a material of the pressure shell 1 is used for the tube 5 as disclosed in Japanese patent application Laid-Open Specification No. 49707/73, a large thermal stress is produced in the tube sheets 2 and 3. This thermal stress is increased as the diameter and length of the reactor are increased. Therefore, designing of a large-size reactor becomes difficult.

Still another problem is that if the pressure on the cooling medium side is elevated and the pressure on the effluent side is lowered from the viewpoint of saving of energy as pointed out hereinbefore, it is necessary to increase the thickness in each of the pressure shell 1, tube sheets 2 and 3 and tubes 5, resulting in a serious economical disadvantage in case of a large-size reaction vessel.

SUMMARY OF THE INVENTION

It is an object of the present invention to provide an improved process wherein gaseous raw materials are reacted in contact with a solid catalyst.

It is another object of the present invention to provide an improved process for catalytic gas-phase reaction in which an improved heat recovery can be effected.

Another object of the present invention is to provide an improved process for catalytic gas-phase reaction in which the optimum temperature distribution in the catalyst layer can be attained.

Further object of the present invention is to provide an improved reaction vessel for reacting gaseous raw materials in contact with a catalyst.

Further object of the present invention is to provide an improved reaction vessel for catalytic gas-phase reaction wherein an improved heat recovery system with improved utilization efficiency of heat of reaction is included.

Still further object of the present invention is to provide an improved reaction vessel for catalytic gas-phase reaction wherein the optimum temperature distribution in the catalyst layer can be attained.

Other and further objects of the present invention will be apparent from the following description.

According to the present invention there are provided the following process for catalytic gas-phase reaction, and apparatus therefor: A process for reacting gaseous raw materials in contact with a solid catalyst layer formed in a vertical cylindrical reaction zone, which comprises passing said gaseous raw materials substantially in the radial direction through said catalyst layer wherein elongated cooling zones having a small diameter are disposed vertically, and passing a cooling medium through said cooling zones to remove heat generated by the reaction effected in said catalyst layer, thereby attaining the optimum temperature distribution in said catalyst layer.

BRIEF DESCRIPTION OF THE DRAWINGS

In the drawings:

FIG. 3 is an enlarged view showing one example of the arrangement of the central and peripheral catalyst receivers in the reaction vessel shown in FIG. 2;

FIG. 6 is a view showing the horizontal section of one example of the central catalyst receiver;

DETAILED DESCRIPTION OF THE INVENTION

Figure 2:
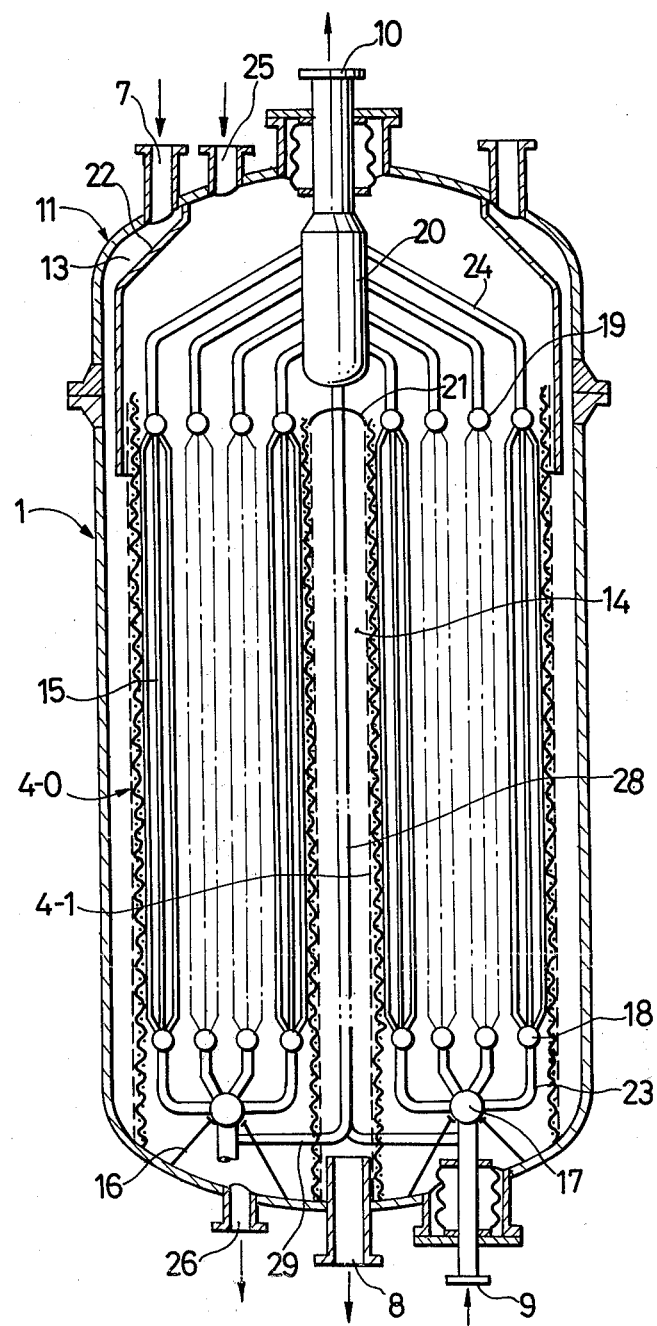
FIG. 2 is a diagram illustrating the vertical section of one embodiment of the reaction vessel according to the present invention.

The outline of the reaction vessel according to the present invention will now be described with reference to FIG. 2. A starting gas compressed to a necessary pressure and preheated to an appropriate temperature is introduced into a cylindrical reaction vessel from a gas inlet 7. After the pressure is uniformalized in a space 13 defined by a partition wall 22 in the portion inside a pressure shell 1, the gas is passed through many holes formed on a peripheral catalyst receiver 4-0 disposed adjacently to the inner face of the pressure shell 1 while it is falling down in a space having an annular horizontal section on the side of the inner face of the pressure shell 1. Then, the gas is introduced in catalyst layers packed in spaces formed among a large number of cooling tubes vertically disposed and the conversion reaction is conducted while the gas is moved substantially horizontally toward the center. Then, the reacted gas is passed through holes formed on an inner catalyst receiver 4-1 disposed adjacently to the inner side of cooling tubes of the group located most closely to the center of the reaction vessel. The gas is collected in a central pressure-uniformalizing space 14 formed in the central portion of the reaction vessel and separated from the upper space by a partition plate 21 and discharged from the reaction vessel through a gas outlet 8. A cooling medium maintained at desired temperature and pressure is introduced from an inlet 9 in the form of a rising stream into an annular first distribution tube 17, and it is then distributed and introduced through tubes 23 connected to the first distribution tube 17 into a number of second distribution tubes 18 arranged concentrically. Then, the cooling medium rises in a large number of cooling tubes 15 connected to the second distribution tubes 18. The cooling medium rising in each of cooling tubes 15 absorbs the heat generated by the conversion reaction in the catalyst layer located outside the cooling tubes 15 and a part of the cooling medium is evaporated and a gas-liquid mixture is formed. Then, the gas-liquid mixture is introduced into a large number of collecting tubes 19 arranged concentrically above the catalyst bed and is collected in a second collecting tube 20 through tubes 24 connected to the first collecting tubes 19. Then, the cooling medium is discharged from the reaction vessel through a cooling medium outlet 10. The cooling medium discharged from the reaction vessel, which is in the form of a gas-liquid mixture, is introduced into a gas-liquid separator, and it is separated into a vapor and liquid. The liquid is returned without cooling to the inlet 9 for re-circulation, forcibly by using a pump, or naturally by the gravity without using a pump. The high pressure and high temperature of the separated vapor are utilized for an intended purpose. Since this step is conducted according to a known method, this step is omitted in FIG. 2.

Characteristic features of the present invention which has been outlined hereinbefore will now be described in detail.

The first characteristic feature of the present invention is that although tube bundles are used for removal of the heat of reaction, tube sheets are not used. If tube sheets is used in the above-mentioned arrangement of cooling tubes according to the present invention, a thick high quality material having a high tensile strength should be used for tube sheets and troublesome operations such as forming through holes on tube sheets, inserting tubes into these through holes and welding the tube sheets to a pressure shell are required. In the present invention, the material to be used for tube sheets can be saved and the number of processing steps can be decreased.

The second characteristic feature of the present invention is that the cooling passage constructed mainly by tubular members need not be fixed to the pressure shell and known leakage preventing telescopic means of the gland system or expander bellows system is disposed only in the portion where the cooling medium inlet 9 and outlet 10 pierce through the upper and lower lids of the pressure shell 1. Since the diameter of this portion is much smaller than the diameter of the junction of the tube sheet 2 or 3 to the pressure shell 1 where such telescopic means should be disposed, provision of such telescopic means can be remarkably facilitated in the present invention. Therefore, it is not necessary that the thermal expansion coefficient of the material of heat transfer tubes should be made equal to that of the material of the pressure shell.

Figure 1:
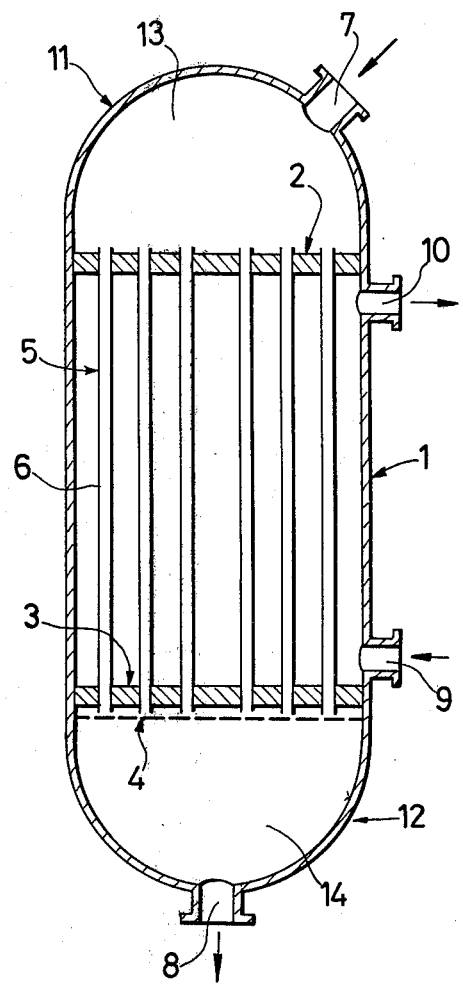
FIG. 1 is a diagram illustrating the vertical section of a known reaction vessel.

The third characteristic feature of the present invention is that the temperature of respective positions of the catalyst layer along the flowing direction of the gas, that is, the temperature distribution, can be made much closer to an optimum value than in the conventional reaction vessel shown in FIG. 1. More specifically in the known reaction vessel shown in FIG. 1, the outer face of each of tubes 5 falls in contact with the cooling medium maintained at the boiling temperature, and the difference of the boiling point at respective positions in the vertical direction is very small. Therefore, it is impossible to design the reaction vessel so that the temperature of each position in the catalyst layer is maintained at a desired level because the heat transfer areas at the respective positions are substantially equal though the quantity of the heat generated by the reaction varies at the respective positions as the gas flows in the catalyst layer 6 in each of the tubes 5. In contrast, in the reaction vessel according to the present invention, since the gas flows through the catalyst layer in the horizontal direction crossing the cooling tubes 15 substantially at a right angle, the temperature distribution at the respective catalyst positions along the gas stream can be maintained at an optimum level by appropriately arranging the diameters and numbers of cooling tubes located at respective catalyst positions differing in the distance from the center of the reaction vessel to produce differences of the catalytic activity among the respective catalyst positions. This characteristic feature is very important and results in an advantage that a certain amount of a gas can be reacted at a high conversion ratio with use of a reduced amount of the catalyst and the size of the reaction vessel can be reduced.

The fourth characteristic feature of the present invention is that when the pressure of the gas for conversion reaction is reduced and the pressure of the cooling medium is elevated in order to save energy as described hereinabove, the material thickness of either the pressure shell 1 or the cooling tubes 15 can be made much smaller than in the structure shown in FIG. 1, and the material cost can be remarkably reduced.

The fifth characteristic feature of the present invention is that both the packing and discharge of the catalyst can be preformed very easily. In the structure shown in FIG. 1, if the catalyst is present above the tube sheet 2 on packing of the catalyst, cooling of the catalyst in this portion becomes insufficient and the temperature is elevated in this portion, resulting in bad influences on maintenance of the strength of the tube sheet. When the amounts of the catalyst packed in respective tubes 5 are not uniform, deflections are caused in the gas stream. Accordingly, in the conventional reaction vessel, it is necessary to pack the catalyst in metered equal amounts to respective tubes. In contrast, in the reaction vessel according to the present invention, the distance between the peripheral faces of every two adjacent tubes is larger than the diameter of the catalyst particle. In the case of a catalyst having an ordinary particle size, packing can be easily accomplished only by introducing a necessary amount of the catalyst from a catalyst feed opening 25 shown in FIG. 2. Even if the catalyst is present in the upper space above the first collecting tube 19 at the packing step, no trouble is caused since the gas hardly passes through this space and a certain cooling capacity is ensured by the tube 24. At the catalyst discharge step, in the conventional reaction vessel shown in FIG. 1, it is very difficult to prevent intrusion of a large quantity of the catalyst into a large-diameter gas discharge pipe connected to the gas outlet 8 when the catalyst receiving net 4 is taken out, even if the attachment position of the gas outlet is changed and the catalyst discharge opening is disposed in the lowermost portion. Therefore, it is necessary to take out this large-diameter gas discharge pipe and withdraw the catalyst from this pipe. In contrast, in the reaction vessel according to the present invention, such troublesome operation need not be conducted and the catalyst can be discharged directly through the catalyst discharge opening 26 from the reaction vessel.

Specific features of embodiments of the present invention will now be described in detail. The first specific feature of the present invention resides in the direction of passage of the gas through the catalyst layer. In the present invention, not only an embodiment in which the gas is passed through the catalyst layer substantially in the horizontal direction from the peripheral portion toward the center as described hereinbefore but also an embodiment in which the gas is passed through the catalyst layer in a reverse direction, that is, from the center toward the peripheral portion substantially in the horizontal direction can be adopted. Whether the former embodiment or the latter embodiment should be adopted is determined according to various factors such as the kinds of the main and side reactions, dependencies of chemical equilibrium final concentrations of the products of these main and side reactions on the pressure and temperature, degrees of influences of the flow rate, temperature and composition of the gas on the catalyst activity for promoting the main and side reaction, the temperature of the gas at the inlet of the catalyst layer, and the quantities of the heat generated and removed at respective portions of the catalyst layer. By adoption of the specific arrangement of cooling tubes described hereinafter, an optimum temperature distribution in the catalyst layer along the gas advancing direction, which minimizes the amount of the catalyst necessary for attaining an intended concentration of the product at the outlet of the catalyst layer, can be determined depending on these factors. In other words, according to the present invention, it is possible to reduce the size of the reaction vessel. For example, when the gas volume is reduced with advance of the reaction or the catalyst activity is drastically reduced with increase of the gas passing through the catalyst layer, as is well known in the art, the reaction rate is decreased with advance of the reaction. If this fact is taken into account, it is seen that in the case where the same conversion product is obtained from the raw gas by using the same catalyst, in the conventional reaction vessel shown in FIG. 1, since the speed of the passing a gas is high in the introduction portion of the catalyst layer where the concentration of the product is very low, the catalyst activity cannot be utilized efficiently and although the passing speed of the gas is lowered in the discharge portion of the catalyst layer, it is necessary to increase the amount of the catalyst packed in this portion since it is impossible to increase the reaction rate because of increase of the amount formed of the reaction product. Moreover, in the conventional structure shown in FIG. 1, since in the introduction portion where a relatively large quantity of the heat is generated, a cooling heat transfer area per unit amount of the gas is smaller than the cooling heat transfer area in the discharge portion where the quantity of the reaction heat is small, if a heat transfer area optimum for the introduction portion is adopted, the heat transfer area in the discharge portion becomes excessive, and therefore, a loss is caused in either the amount of the catalyst or the heat transfer area.

In contrast, if the embodiment where the gas is passed through the catalyst layer from the peripheral portion toward the center is adopted for the reaction vessel according to the present invention, at the initial stage of the passage through the catalyst layer, the catalyst activity is exerted most efficiently with a low gas speed, and the reaction is promoted with a smaller amount of the catalyst than in the conventional reaction vessel shown in FIG. 1, and a sufficiently large heat transfer area per unit amount of the gas is ensured for removal of the heat generated by the reaction. Furthermore, since the reaction vessel is arranged so that the amount of the catalyst and the heat transfer area are reduced with decrease of the gas volume and the generated reaction heat according to advance of the reaction, an optimum cooling heat transfer area can be arranged at each position in the catalyst layer. Namely, the temperature distribution in the catalyst layer can optionally be set. More specifically, a temperature distribution minimizing the amount of the catalyst and the heat transfer area necessary for obtaining a certain amount of the conversion product as a whole can be realized according to the kinds of the chemical reactions and the characteristics of the catalyst, which are closely concerned with the design of the reaction vessel as pointed out hereinbefore. Moreover, the size of the reaction vessel can be reduced. When the change of the chemical equilibrium concentration of the conversion product according to the change of the temperature is small, reduction of the gas volume with advance of the reaction is small or the change of the catalyst activity according to the change of the passing speed of the gas is small, another embodiment in which the gas is passed through the catalyst layer from the center to the peripheral portion is adopted. In this embodiment, the temperature of the gas supplied to the central portion is maintained at a level as low as permissible from the viewpoint of the catalyst activity and cooling tubes are not arranged in the portion close to the gas inlet in the catalyst layer, but cooling tubes are arranged at positions subsequent to the position where the gas temperature is elevated by the heat of reaction to an upper allowable level for the catalyst so that further increase of the gas temperature is prevented at these catalyst positions. By this arrangement, the speed of the gas passing through the catalyst layer is reduced at the final stage of the reaction where the concentration of the conversion product is increased, with the result that the reaction can be completed in a short time and the amount of the catalyst and the heat transfer area can be reduced.

The second specific feature of the present invention resides in arrangement of cooling tubes. As pointed out hereinbefore, in the present invention, the cooling tubes are arranged according to the kind of the conversion reaction and the characteristics of the catalyst used so that an optimum temperature distribution can be attained along the radial direction in the catalyst layer. In this reaction vessel where the gas is caused to flow in the radial direction, it is preferred that the flow amounts of the gas in respective radial directions be equal. The presence of cooling tubes in the catalyst layer has influences on flowing of the gas. Accordingly, in order to uniformalize the flow amounts of the gas in all the radial directions, it is most preferred that cooling tubes be arranged concentrically. An appropriate number of concentric circles on which cooling tubes are arranged are formed according to the size of the reaction vessel and the quantity of the heat generated by the reaction. The distance between the periphery of the catalyst layer and the outermost concentric circle, the distance between two adjacent concentric circles and the distance between the innermost concentric circle and the inner circumference of the catalyst layer should be determined according to the kind of the conversion reaction, the characteristics of the catalyst used and design factors such as the flowing direction of the gas so that an optimum temperture distribution can be produced in the catalyst layer, and equal distances are not always adopted in the present invention. In order to enhance the effects of the present invention, it is important to adjust the arrangement density of the heat transfer area according to the positions of the concentric circles by adopting different diameters for the cooling tubes for removing the heat of reaction.

In the present invention, it is important that the flow amount of the cooling medium should be equal among the cooling tubes located on one concentric circle. From this viewpoint, it is not desired that the cooling tubes are disposed horizontally or in an inclined manner but it is preferred that they be disposed vertically.

The third specific feature of the present invention resides in the manner of using the cooling medium. As the cooling medium, there can be used any of a gas, a liquid and a gas-liquid mixture in the present invention. When the gas is used, the sensible heat is utilized. When the liquid is employed, there can be adopted a sensible heat utilization method in which the temperature of the liquid containing at least one component is elevated while keeping the liquid state to absorb the heat of reaction, and a latent heat utilization method in which the liquid is evaporated by absorbing the heat of reaction. When the gas-liquid mixture is employed, there can be adopted the above-mentioned two methods utilizing the sensible heat of the liquid and the evaporation latent heat of the liquid. Moreover, in this case, there may be considered two manners; that is, a manner in which the constituent of the liquid is soluble in the condensate of the constituent of the gas (vapor) and a manner in which the liquid is insoluble in the condensate of the vapor. For example, the first manner is applicable to a combination of a hydrocarbon liquid and a hydrocarbon gas (vapor) or water and steam, and the second manner is applicable to a combination of steam and a hydrocarbon liquid. When the method using the sensible heat is adopted, the temperature of the cooling medium at the outlet is higher than the temperature of the cooling medium at the inlet even if any of the gas, liquid and gas-liquid mixture is used, and there is caused a certain temperature difference between the upper and lower portions of the catalyst layer. Moreover, in the method utilizing the sensible heat, it is necessary to use the cooling medium in a much larger amount than in the method utilizing the latent heat. Accordingly, the method using the sensible heat may be adopted only when no particular disadvantage is caused even if a certain temperature difference is observed between the upper and lower potions of the catalyst layer or when the quantity of the reaction heat is relatively small. Accordingly, in the present invention, it is preferred to adopt the method utilizing the evaporation latent heat for absorbing the heat of reaction, the above method is divided into the manner where the liquid and vapor are soluble each other and the manner where the liquid and vapor are not soluble each other, as pointed out above. These manners will be described in detail hereinafter.

As described hereinbefore, there may be considered various methods as to the manner of using the cooling medium. However, in any case, it is necessary to reduce the necessary heat transfer area as pointed out hereinbefore, and in order to attain this reduction, it is important that the viscosity of the cooling medium inside the cooling tube should be low. More specifically, in order to attain the objects of the present invention, it is indispensable that the viscosity of the cooling medium should be lower than 1 poise. When the sensible heat of the cooling medium is utilized, it is possible to cause the cooling medium to flow through the cooling tube in the form of a downward stream. However, in order to pass the cooling medium uniformly through the respective cooling tubes, it is preferred to cause the cooling medium to flow in the form of an upward stream in either the method utilizing the sensible heat or the method utilizing the latent heat.

The fourth specific feature of the present invention resides in the manner of supporting the catalyst. As described hereinbefore, in the reaction vessel of the present invention, the catalyst is not present in the outermost peripheral portion and the central portion, and there should be present spaces allowing passage of the gas in these two portions. Accordingly, when the catalyst is charged from the catalyst feed opening 25 shown in FIG. 2, catalyst receivers should be disposed so that catalyst particles are not intruded in these two spaces. One catalyst receiver should be arranged for each of the peripheral portion and central portion. However, the manner of disposing the catalyst receiver in the peripheral portion is somewhat different from the manner of disposing the catalyst receiver in the central portion. The following three methods may be adopted for disposing the catalyst receiver in the peripheral portion.

According to the first method, as shown in FIG. 3, a cylindrical plate 4-2 having through holes 4-4, the number and open area of which are arranged so as to allow passage of a necessary amount of the gas, is dismountably fitted in the inner circumferential portion of the pressure shell 1 with a certain distance from the inner face of the pressure shell by means of an appropriate number of supporting plates 27. These supporting plates are arranged along the inner circumferential face of the pressure shell 1 and are spaced from one another by a distance necessary for allowing passage of the gas. At least one net 4-3 having an appropriate mesh number is fixed to the inner circumferential face or outer peripheral face of the perforated plate 4-2, whereby a catalyst receiver is constructed on the inner circumference of the pressure shell. The lower portion of the cylindrical perforated plate 4-2 reaches the bottom head of the pressure shell 1 and the upper portion of the perforated plate 4-2 is extended slightly beyond the top end of the first collecting tube 19 for the cooling medium. In order to prevent the short-cut passage of the gas, it is preferred that the through hole 4-4 or net 4-3 be not located in a certain region of the upper or lower portion of the preforated plate 4-2. In this method, construction of the catalyst receiver is very easy and the catalyst receiver is used conveniently.

Figure 4:
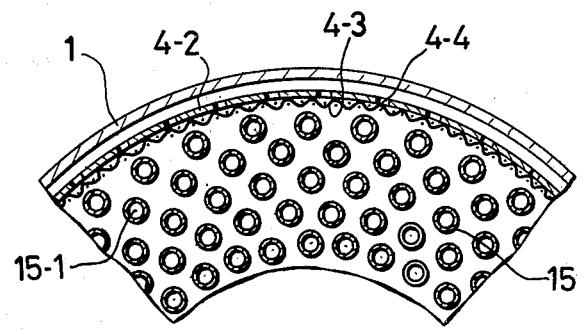
FIG. 4 is a view showing the horizontal section of the one example of the peripheral catalyst receiver shown in FIG. 3.

According to the second method, as shown in FIG. 4, a catalyst receiver is arranged and fixed to cooling tubes 15-1 of the group located on the outermost concentric circle along the periphery or inner circumference therefor substantially in the same manner as in the first method.

Figure 5:
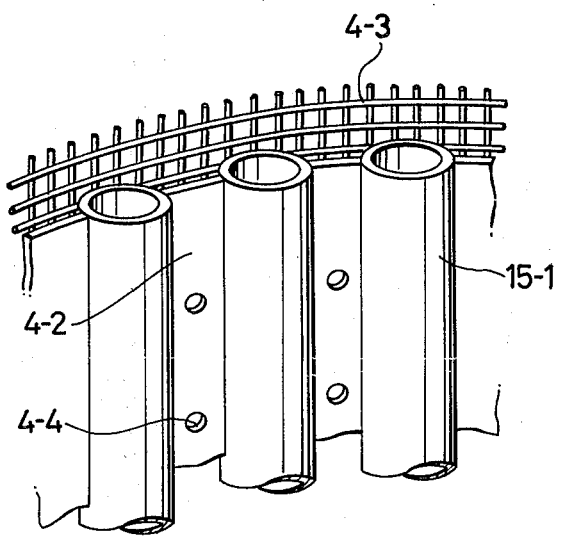
FIG. 5 is a view showing examples of the structures of the peripheral and central catalyst receivers.

According to the third method, as shown in FIG. 5, a perforated plate 4-2 having through holes 4-4, the open area and number of which are arranged so as to allow passage of the necessary quantity of the gas, are disposed along the central circle, peripheral circle or inner circumference of cooling tubes 15-1 of the group located on the innermost concentric circle to connect every two adjacent cooling tubes and a net 4-3 is disposed on the inner or outer side of the perforated plate 4-2 in the same manner as in the first or second method.

In each of these three methods, the relative attachment positions of the net 4-3 and perforated plate 4-2 shown in FIGS. 3, 4 and 5 may be reversed. According to the second and third method, processing for construction of the catalyst receiver is facilitated.

Figure 7:
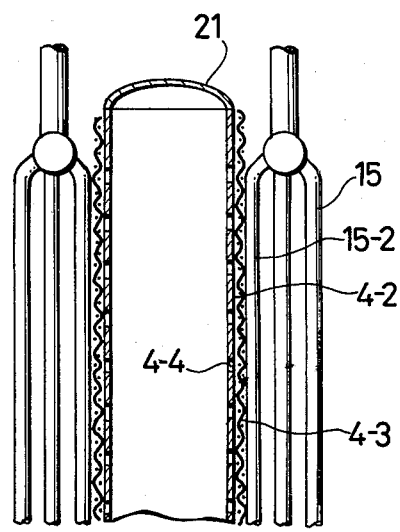
FIG. 7 is a view showing the vertical section of the central catalyst receiver.

The catalyst receiver to be disposed in the central portion will now be described. The method for disposing the catalyst receiver in the central portion shown in FIG. 3 corresponds to the first method for disposing the catalyst receiver in the peripheral portion. According to this method, a suitable number of nets 4-3 having an appropriate mesh number are fixed to the peripheral or inner circumferential portion of a perforated cylindrical plate 4-2 having an appropriate number of holes 4-4 having an appropriate open area and having a partition plate 21 attached to the upper portion thereof, and the assembly is fitted in the portion where the gas discharge nozzle 8 is intruded into the interior of the pressure shell 1 or fixed to this portion by welding or the like. This method is advantageous with respect to the manufacture and use of the catalyst receiver. Furthermore, methods corresponding to the second and third methods for disposing the catalyst receiver in the peripheral portion may be practically adopted. More specifically, as shown in FIG. 6, a cylindrical perforated plate 4-2 having through holes 4-4, the number and open area of which are arranged so as to allow passage of the necessary quantity of the gas, is disposed along the inner circumference or periphery of cooling tubes 15-2 of the group located on the innermost concentric circle, and a net-4-3 is located on the inner or outer side of the perforated plate 4-2 contiguously thereto, whereby a catalyst receiver for the central portion is constructed. Furthermore, there may be adopted a method in which cooling tubes 15-2 of the group located on the innermost concentric circuit are connected to one another by a band-like plate 4-2 having an appropriate number of through holes 4-4 having an open area in the same manner as in the catalyst receiver for the peripheral portion shown in FIG. 5, and a net 4-3 is fixed along the periphery or inner circumference of the group of the tubes 15-2, whereby a catalyst receiver for the central portion is constructed. In each of these catalyst receivers for the central portion, a lid 21 as shown in FIG. 7 should be attached to the upper portion of the catalyst receiver for the central portion. The positional relationship of the through holes 4-4 and at least one net 4-3 in the lower and upper end portion of the catalyst receiver for the central portion to the first and second collecting tubes 19 and 18 is substantially the same as in the catalyst receiver for the peripheral portion.

A first advantage attained by disposition of the above-mentioned catalyst receivers is that processing for the manufacture can be facilitated, and a second advantage is that the distance between every two adjacent tubes 15-1 or 15-2 located on the innermost or outermost concentric circle, the open area of the through holes formed on the plate 4-2 and the distribution of these through holes can optionally be changed and adjusted, whereby only by disposition of one wall face, the amount of the passing gas can be uniformalized with respect to each radial direction of the catalyst layer and each height of the catalyst layer without using two wall faces defining the catalyst layer on the side of the gas inlet or outlet as disclosed in Japanese Pat. Publication No. 5925/66. When the above-mentioned catalyst packing method is adopted, according to properties of the catalyst used, it sometimes happenes that the catalyst particles are not packed at a uniform density throughout the catalyst layer. In such case, it is preferred that the above-mentioned function of controlling the flow amount of the gas be imparted to each of the perforated cylindrical plates of the catalyst receivers for the central and peripheral portions and perforated cylinders for controlling the flow amount of the gas or cooling tubes arranged in concentrical circles with a small distance between every two adjacent tubes be disposed at one or two portions intermediate between the periphery and inner circumference of the catalyst layer. The shape and configuration of holes formed on these perforated cylinders for controlling the flow amount of the gas are not particularly critical, but from the viewpoint of easiness in the manufacture, round holes are preferred.

The fifth specific feature of the present invention resides in the arrangement of the distributing and collecting tubes. In some cases, the total number of the cooling tubes 15 is small, but in may cases, a large number of cooling tubes 15 are used. In the case where the total number of the cooling tubes 15 is small, it is possible to connect all the cooling tubes to one first distributing tube 17 shown in FIG. 2. Accordingly, a second distributing tube 18 need not be disposed in this case. However, in the case where a large number of cooling tubes 15 are disposed and it is impossible to connect all the cooling tubes to one first distributing tube 17, second distributing tubes 18 are disposed and parts or all of the cooling tubes 15 are connected to these second distributing tubes 18 and the second distributing tubes 18 are connected to the first distributing tube 17 through connecting tubes 23. When a very large number of cooling tubes 15 are used, by disposing third and fourth distributing tubes in the same manner as described above, it is possible to apply the present invention to a reaction vessel having a very large size. In the embodiment shown in FIG. 2, second distributing tubes are disposed. Of course, the present invention is not limited to this embodiment shown in FIG. 2. When these distributing tubes are disposed, it is preferred that the distribuing tubes of respective groups be arranged on concentric circles with sufficient spacings to connect them to the cooling tubes 15 and connecting tubes 23, because the manufacture is facilitated and the reaction vessel is used conveniently. Furthermore, in order to distribute the cooling medium uniformly in a large number of cooling tubes 15, it is important that at least two inlet tubes 9 for introducing the cooling medium to the first distributing tubes, at least two connecting tubes 23 for connecting the first distributing tubes 17 to second distributing tubes and at least two connecting tubes for connecting second distributing tubes to third distributing tubes should be disposed at positions symmetric with respect to the central axis.

Collecting tubes 19 are arranged substantially in the same manner as described above with respect to the distributing tubes. When the number of cooling tubes is relatively small, all the cooling tubes can be connected to one collecting tube. However, when a large number of cooling tubes are disposed, it is necessary to dispose first, second and third collecting tubes on concentric circles and dispose at least one connecting tube 24 to connect these collecting tubes. From the viewpoint of easiness in the manufacture or use, it is preferred that the number of collecting tubes be gradually decreased in the respective groups. However, in the embodiment shown in FIG. 2, in order to distribute the cooling medium uniformly in all the cooling tubes, one final collecting tube 20 is disposed, and it is ordinarily preferred that the size and shape of this final collecting tube 20 be determined so that an appropriate flow rate is maintained in the final collecting tube 20. When the reaction vessel is very large and the quantity of the reaction heat is relatively small, the above-mentioned method utilizing the evaporation latent heat of the cooling medium is used and there is preferably adopted a structure in which a function of separating the liquid from the vapor is given to the final collecting tube, a tube 28 for bringing down the separated liquid, indicated by broken lines in FIG. 2, is disposed in the gas space in the central portion. The pipe 28 is connected to the first distributing tubes 17 through at least one connecting tube 29 to effect natural circulation of the cooling medium in the reaction vessel. Only the vapor of the cooling medium is withdrawn from the cooling medium outlet 10 and the cooling medium in an amount corresponding to the amount of the vapor withdrawn from the outlet 10 is supplied from the cooling medium inlet 9. In this embodiment, the structure can be simplified and the operation can be performed advantageously, as compared with the embodiment where a vapor-liquid separator is disposed outside the reaction vessel and the liquid left after separation of the vapor is recycled and returned to the cooling medium inlet 9 through a liquid dropping tube naturally by the gravity or forcibly by using a pump. A sealed vessel isolated from the pressure shell may be used as the structure for branching or collection of the colling medium instead of the above-mentioned tubular members.

The sixth specific feature of the present invention resides in means for moderating the thermal stress caused by the difference of the thermal expansion. In the reaction vessel according to the present invention, as described hereinbefore, the temperature difference in the catalyst layer during the operation is much smaller than in the conventional reaction vessel. However, a certain temperature difference is inevitably observed. Accordingly, a slight thermal stress is caused because of the temperature difference in the connecting portion of each of the tubular members constituting the cooling structure, for example, the distributing tubes 17 and 18, the connecting tubes 23, the cooling tubes 15, the collecting tubes 19 and 20 and the connecting tubes 24. Since the cooling structure is constructed by tubular members, such thermal stress may be moderated and dispersed by forming curved portions in the respective tubes. Therefore, the cooling structure fabricated by tubes having a curved portion is ordinarily preferred. Although there is present a temperature difference between the pressure shell 1 and the cooling structure, generation of a thermal stress by this temperature difference can be completely prevented by applying known telescopic gas leakage preventing means of the gland or expansion bellows type as shown in FIG. 2 to the portion where cooling medium inlet and outlet tubes for the cooling structure, such as the cooling medium inlet 9 and cooling medium outlet 10, penetrate through the pressure shell 1.

Figure 8:
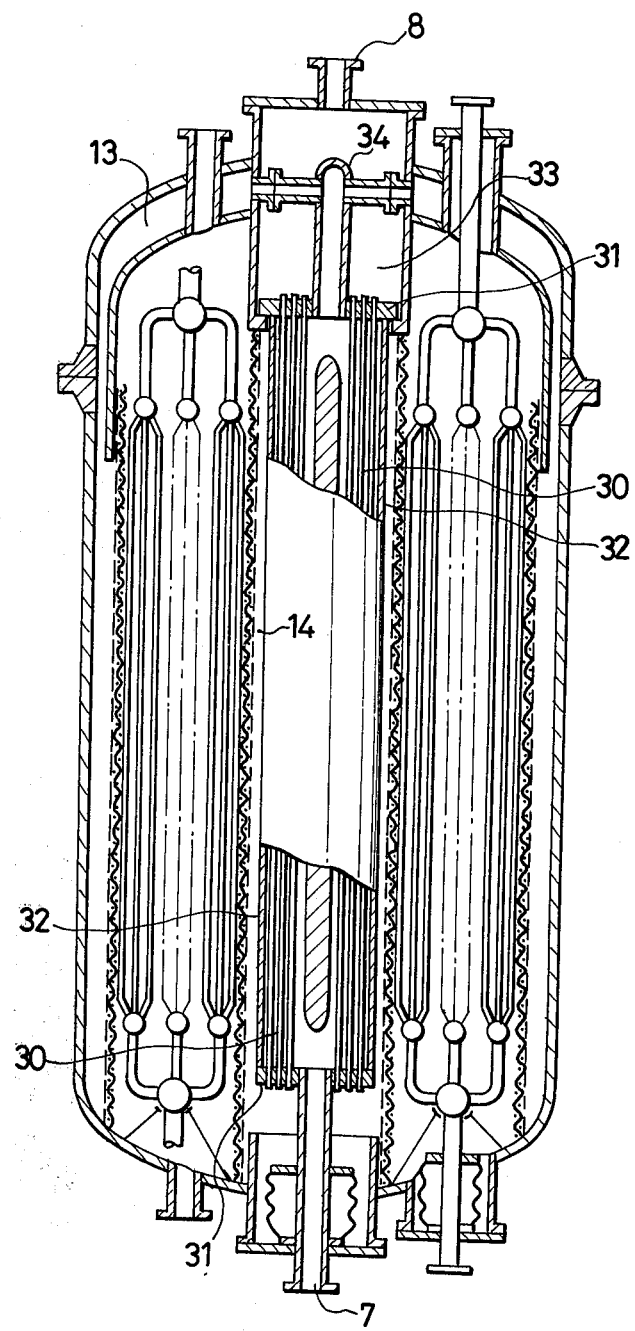
FIG. 8 is a diagram illustrating a specific embodiment in which a starting gas-preheating heat exchanger is disposed in the space of the central portion of the reaction vessel of the present invention.

The seventh specific feature of the present invention resides in the manner of preheating the raw gas to be introduced in the reaction vessel. When the reaction vessel of the present invention having the above-mentioned structure is used, substantially all of the reaction heat can be absorbed in the cooling medium, and the temperature of the reaction effluent gas leaving from the catalyst layer corresponds to the outlet temperature of the catalyst layer in which the above-mentioned temperature distribution is produced and this temperature is slightly higher than the temperature of the raw gas at the inlet of the catalyst layer. Accordingly, the gas to be introduced into the catalyst layer can be preheated by performing heat exchange between the gas leaving from the catalyst layer and the gas to be introduced into the catalyst layer. This heat exchange may be accomplished by using a known heat exchanger disposed outside the reaction vessel. Furthermore, the heat exchange can be accomplished by disposing a heat exchanger in a space in the interior of the reaction vessel as shown in FIG. 8. More specifically, in the embodiment shown in FIG. 8, a known cylindrical multi-tube type heat exchanger is disposed in the space of the central portion of the reaction vessel. This heat exchanger comprises as main members a large number of tubes 30, a tube plate 31 to which the tubes 30 are fixed and a shell 32 of the heat exchanger.

In the embodiment shown in FIG. 8, the starting gas for conversion is introduced from a gas inlet 7 into a space on the shell side of the cylindrical multi-tube heat exchanger, which is defined by the outer faces of the tubes 30, the tube sheet 31 and the inner shell 32, and heat exchange is effected between the so introduced starting gas and the high temperature gas withdrawn from the outlet of the catalyst layer, which passes through the tubes 30. The so preheated gas is passed through a distributing tube 34 and introduced into the catalyst layer from an inlet space 13 of the catalyst layer in the above-mentioned manner. The gas discharged to an outlet space 14 from the catalyst layer is introduced into the insides of tubes 30 from the lower portions thereof and heat exchange is effected between this discharge gas and the strating gas flowing on the shell side to lower the temperature of the discharge gas. Then, the discharge gas is discharged from the reaction vessel through an outlet space 33 and a gas outlet 8.

When the preheating heat exchanger as described above is used, the pressure difference between the outside and inside of the tube sheet 31 is due mainly to the pressure loss caused in the gas while it is passing through the catalyst layer. Since this pressure difference is very small, any particular disadvantage is not brought about by disposition of the tube sheet 31.

Another example of the method of preheating a raw gas to be introduced into the reaction vessel according to the present invention is a method in which the raw gas is first introduced into an insulated prereactor, the gas introduced therein is subjected to a conversion reaction to a certain extent and increased in temperature, and then the gas thus increased in temperature is introduced into the reactor of the present invention. The raw gas usually contains trace amounts of catalyst poison. The deactivation itself of the catalyst due to the catalyst poison cannot be prevented with the reaction vessel according to the present invention nor with the conventional reaction vessel. However, the introduction of the raw gas into a small size insulated prereactor causes the uptake of the total amount of the catalyst poison in the catalyst bed of the prereactor with the result that the life of the catalyst in the reaction vessel according to the present invention, which functions as a main reaction vessel, is greatly prolonged.

The primary purpose of the isolated prereactor mentioned above resides in the removement of the catalyst poison and in increasing the temperature of the raw gas to a temperature suitable for the gas to be introduced into the main reaction vessel by effecting the conversion reaction to an appropriate extent. Therefore, the prereactor may be of much smaller and simpler construction compared with the reaction vessel according to the present invention as a main reaction vessel.

The life of the catalyst in the main reaction vessel is greatly prolonged and further the operation efficiency of the plant as a whole including the process for the preparation of the raw gas is increased by an operation process in which when the catalyst in the prereactor is deactivated, the operation of the prereactor only is stopped, the raw gas is introduced directly into the main reaction vessel only during the period while the deactivated catalyst is exchanged.

A pair of prereactors may desirably be provided to be used alternately.

Any of materials that can resist various stresses caused under actually adopted operation conditions such as the conversion pressure, the conversion temperature, the cooling medium pressure and the cooling medium temperature and have no bad influences on the conversion reaction can be used as the structural material of the reaction vessel.

Applications of the reaction vessel according to the present invention will now be described. The reaction vessel according to the present invention can be applied to chemical exothermic reactions in which the starting material introduced into the catalyst layer and the reaction product leaving from the catalyst layer are kept gaseous under the temperature and pressure conditions causing the conversion reaction and it is desired to produce an appropriate temperature distribution in the catalyst layer or to perform strict control of the temperature throughout the catalyst layer. As such chemical exothermic reaction, there can be mentioned, for example, preparation of ammonia from a starting gas containing hydrogen and nitrogen, preparation of methanol, methane or a hydrocarbon having two or more of carbon atoms from a starting gas containing hydrogen and carbon monoxide and/or carbon dioxide, preparation of hydrogen from a starting gas containing steam and carbon monoxide, preparation of a saturated chlorinated hydrocarbon such as chloromethane or ethylene chloride from a starting gas containing a hydrocarbon and chlorine, oxidation reaction of preparing ethylene oxide, maleic anhydride or phthalic anhydride from a starting gas containing a hydrocarbon and oxygen, oxychlorination reaction of preparing an unsaturated chlorinated hydrocarbon such as vinyl chloride from a starting gas containing a hydrocarbon and chlorine and/or hydrogen chloride and oxygen, ammoxidation reaction for preparing a cyanogen compound such as acrylonitrile or cyanic acid from a starting gas containing a hydrocarbon, ammonia and oxygen, hydrogenation reaction of preparing a saturated hydrocarbon such as cyclohexane from a starting gas containing an unsaturated hydrocarbon and hydrogen, alkylation reaction of preparing iso-octane or ethylbenzene from a starting gas containing an unsaturated hydrocarbon and a saturated hydrocarbon and oxidation reaction of preparing formaldehyde or the like from a starting gas containing an oxygen-containing organic compound and oxygen. When the reaction vessel according to the present invention is used, there are attained various advantages such as saving of energy throughout the entire process steps by improvement of the utilization efficiency of the reaction heat, facilitation or designing of the reaction vessel and reduction of the cost of the material for construction of the reaction vessel. Furthermore, in each of the foregoing chemical reactions, it is possible to increase the yield of the intended product, inhibit formation of the side product and prolong the life of the catalyst, since the temperature distribution in the reaction layer can be optimized and the temperature throughout the catalyst layer can be precisely controlled. The kind of the catalyst is not particularly critical when the reaction vessel according to the present invention is applied to the foregoing chemical reactions, and a catalyst suitable for the intended reaction can be used. Furthermore, the capacity of the reaction vessel can be enhanced by arranging two or more of catalysts differing in the catalytic characteristics so that the gas falls in contact with different catalysts with advance in the catalyst layer. Especially great technical and economical advantages can be attained when the present invention is applied to large-scale production of ammonia or methanol conducted under a pressure lower than 100 $Kg/cm^2G$.

Utilization of the heat of reaction absorbed in the cooling medium will now be described. The heat of reaction may be utilized in various field. In the case of the method utilizing the sensible heat of the cooling medium, the reaction vessel can be used for elevating the temperature of a starting material which is to be used at a step requiring a high temperature. Also in the case of the method utilizing the evaporation latent heat of the cooling medium, the heat of reaction absorbed may be similarly utilized. For example, in preparation of ammonia from naphtha, a mixture of naphtha with high pressure steam or hot water is used as the cooling medium to heat steam or evaporate naphtha in the reaction vessel according to the present invention, thereby the high temperature gas is used as the starting material for the step of preparing hydrogen as the starting material of ammonia. In case of the method utilizing the evaporation latent heat, the heat of reaction may be utilized for other purposes. For example, the vapor is separated from the liquid and is then introduced to other step for heating other substance directly or indirectly. Furthermore, the heat of reaction is converted to a mechanical power by utilizing the pressure of the vapor in a turbine directly or after heating. The mechanical power is utilized for compressing the gas to be introduced into the reaction vessel. The boiling point of the cooling medium to be used in the reaction vessel can be adjusted to a level slightly lower than the catalyst layer temperature which is determined according to the kind of the conversion reaction and the characteristics of the catalyst used, by adjusting the inlet temperature and flow rate of the cooling medium or controlling the pressure applied to the cooling medium. Any of cooling media that can hardly be degraded by the heat during the operation and have no corrosive action on the material of the reaction vessel can be used in the present invention. In the case of the method utilizing the evaporation latent heat of the cooling medium, from the viewpoint of effective utilization of the energy possessed by the vapor of the cooling medium, it is preferred to use as the cooling medium water, an aliphatic hydrocarbon fraction or an aromatic compound such as an aromatic hydrocarbon, a chlorinated aromatic hydrocarbon or diphenyl oxide or a mixture thereof. When such cooling medium is used for the method utilizing the evaporation latent heat, the temperature throughout the catalyst layer can be strictly controlled by appropriately adjusting the pressure of the cooling medium and the boiling point of the cooling medium. The allowable upper limit of the pressure of the cooling medium is this method is about 150 $Kg/cm^2G$ in the case of the above-mentioned natural circulation or about 200 Kg/cm²G in case of the above-mentioned forced circulation. If the pressure exceeds this critical level, the cooling capacity of the cooling tubes is reduced.

What is claimed is:

1. A reaction vessel for exothermic catalytic gas-phase reaction, said reaction vessel comprising a vertical, cylindrical shell; an inlet for gaseous raw materials and an outlet for reaction effluent gas; an inlet and an outlet for a cooling medium; a cylindrical, peripheral catalyst receiver open at both ends and having a plurality of holes through the wall thereof, said peripheral catalyst receiver being disposed vertically inside said shell; a cylindrical, central catalyst receiver having a plurality of holes through the wall thereof and being disposed vertically inside said peripheral catalyst receiver; a solid catalyst layer comprising a catalyst packed in the space between said peripheral and said central catalyst receiver; a plurality of vertically extending cooling tubes connected at one end thereof to said inlet for the cooling medium and at the other end thereof, to said outlet for the cooling medium said plurality of cooling tubes being disposed in said catalyst layer; a first, peripheral pressure-uniformalizing space between said sheel and said peripheral catalyst receiver; and a second, central pressure-uniformalizing space inside said central catalyst receiver which second space is separated from said first space by a partition plate disposed at one end of said central catalyst receiver; said inlet for the gaseous raw materials being connected to one of said spaces whereby the flow of said gaseous raw materials is substantially in the radial direction while removing the heat of reaction that has been generated, to thereby attain an optimum temperature distribution along the radial direction, and is then discharged through said outlet for the reaction effluent gas connected to said other space.

2. A reaction vessel as claimed in claim 1 wherein the center of the cooling tubes are arranged on at least one circle, the center of which is substantially coaxial with the center of the reaction vessel at least in the horizontal section of the catalyst layer.

3. A reaction vessel as claimed in claim 2 wherein said cooling tubes are arranged in a plurality of substantially concentric circles.

4. A reaction vessel as claimed in claim 3 wherein the dimension between the periphery of the catalyst layer and the outermost concentric circle on which the cooling tubes are arranged, the dimension between every two adjacent concentric circles on which the cooling tubes are arranged and the dimension between the innermost concentric circle on which the cooling tubes are arranged and the inner circumference of the catalyst layer are adapted to be adjusted to predetermined sizes with in the radial direction.

5. A reaction vessel as claimed in claim 3 wherein the cooling tubes arranged on each concentric circle are disposed so that the dimension between every two adjacent tubes is adapted to be adjusted to a predetermined size on the respective concentric circle.

6. A reaction vessel as claimed in claim 1 further including multi-tube structure means comprised of tubular members for distributing the cooling medium into the cooling tubes and for collecting the cooling medium from the respective cooling tubes and discharging the cooling medium.

7. A reaction vessel as claimed in claim 1 wherein the cooling tubes are of different diameter.

8. A reaction vessel as claimed in claim 1 wherein at least one layer of a performated plate is disposed between said peripheral and said central catalyst receivers.

9. A reaction vessel as claimed in claim 1 which is used for ammonia synthesis from hydrogen and nitrogen or methanol synthesis from hydrogen and carbon monozide and/or carbon dioxide.

10. A reaction vessel as claimed in claim 1 wherein said inlet for the gaseous raw materials is connected to said peripheral pressure-uniformalizing space and said outlet for the reaction effluent gas is connected to said central pressure-uniformalizing space.

11. A reaction vessel as claimed in claim 1 wherein said inlet for the gaseous raw materials is connected to said central pressure-uniformalizing space and said outlet for the reaction effluent gas is connected to said peripheral pressure-uniformalizing space.

* * * * *